(12) United States Patent
Sadamitsu

(10) Patent No.: US 11,713,703 B2
(45) Date of Patent: Aug. 1, 2023

(54) METHOD OF MANUFACTURING ELECTRICALLY HEATED CATALYST DEVICE, METAL THIN PLATE FOR ELECTRODE OF ELECTRICALLY HEATED CATALYST DEVICE, AND ELECTRICALLY HEATED CATALYST DEVICE

(71) Applicant: TOYOTA JIDOSHA KABUSHIKI KAISHA, Aichi-ken (JP)

(72) Inventor: Takahiro Sadamitsu, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 227 days.

(21) Appl. No.: 17/335,083

(22) Filed: Jun. 1, 2021

(65) Prior Publication Data

US 2021/0381418 A1 Dec. 9, 2021

(30) Foreign Application Priority Data

Jun. 4, 2020 (JP) ................. 2020-097922

(51) Int. Cl.
*F01N 3/027* (2006.01)
*F01N 3/20* (2006.01)
*F01N 3/28* (2006.01)
*B01J 35/00* (2006.01)
(Continued)

(52) U.S. Cl.
CPC ........... *F01N 3/2026* (2013.01); *B01D 53/94* (2013.01); *B01J 35/0033* (2013.01); *B01J 35/04* (2013.01); *F01N 3/2803* (2013.01); *B01D 2255/1021* (2013.01); *B01D 2255/1023* (2013.01);
(Continued)

(58) Field of Classification Search
CPC .. F01N 3/2013; F01N 3/2026; F01N 2240/16; H05B 2203/022; H05B 2203/024
See application file for complete search history.

(56) References Cited

U.S. PATENT DOCUMENTS

2012/0121476 A1 5/2012 Kinoshita et al.
2013/0062328 A1* 3/2013 Shimoda ................. H05B 3/08
427/446

(Continued)

FOREIGN PATENT DOCUMENTS

| JP | 2000-331137 A | 11/2000 |
| JP | 2019209245 A | 12/2019 |
| WO | 2012063353 A1 | 5/2012 |

*Primary Examiner* — Jonathan R Matthias
(74) *Attorney, Agent, or Firm* — Hauptman Ham, LLP

(57) ABSTRACT

A method of manufacturing an electrically heated catalyst device includes preparation of a metal thin plate as a material of a metal electrode layer. The metal thin plate includes wiring portions, a base, a terminal portion, a second base, and a pseudo terminal portion. The method includes supplying current between the terminal portion and the pseudo terminal portion of the metal thin plate after fixing layers are formed; and forming the metal electrode layer by removing a portion of the metal thin plate between a smallest cross-sectional area portion and a distal end of the pseudo terminal portion through melting and cutting of the smallest cross-sectional area portion using the Joule heat generated by the supplied current. The smallest cross-sectional area portion is a part of the metal thin plate that has a smallest area in a cross section perpendicular to the extending direction of the wiring portions.

9 Claims, 11 Drawing Sheets

(51) Int. Cl.
  *B01J 35/04* (2006.01)
  *B01D 53/94* (2006.01)
(52) U.S. Cl.
  CPC ............. *B01D 2255/1025* (2013.01); *B01D 2255/9155* (2013.01)

(56) References Cited

U.S. PATENT DOCUMENTS

| | | | |
|---|---|---|---|
| 2014/0301908 A1* | 10/2014 | Takagaki | B01J 35/04 422/174 |
| 2015/0247436 A1* | 9/2015 | Nakayama | B01J 19/2485 29/890 |
| 2016/0032806 A1* | 2/2016 | Sugiyama | F01N 3/2026 422/174 |
| 2016/0271561 A1* | 9/2016 | Nakayama | B01D 53/9454 |
| 2019/0368403 A1 | 12/2019 | Mori et al. | |

* cited by examiner

METHOD OF MANUFACTURING ELECTRICALLY HEATED CATALYST DEVICE, METAL THIN PLATE FOR ELECTRODE OF ELECTRICALLY HEATED CATALYST DEVICE, AND ELECTRICALLY HEATED CATALYST DEVICE

RELATED APPLICATIONS

The present application claims priority of Japanese Application Number 2020-097922, filed on Jun. 4, 2020, the disclosure of which is hereby incorporated by reference herein in its entirety.

BACKGROUND

1. Field

The present disclosure relates to a method of manufacturing an electrically heated catalyst device, a metal thin plate for an electrode of an electrically heated catalyst device, and an electrically heated catalyst device.

2. Description of Related Art

For example, Japanese Laid-Open Patent Publication No. 2019-209245 discloses an electrically heated catalyst device, which heats a catalyst through energization. As shown in FIG. 10, the electrically heated catalyst device disclosed in Japanese Laid-Open Patent Publication No. 2019-209245 includes a cylindrical catalyst support 200 and two electrodes 201 for supplying current to the catalyst support 200. FIG. 10 illustrates only one of the two electrodes 201 of the electrically heated catalyst device.

Each electrode 201 includes a metal electrode layer 203, a film-shaped surface electrode layer 204, and fixing layers 205. The metal electrode layer 203 includes wiring portions 202 arranged parallel with each other. The surface electrode layer 204 is arranged between the metal electrode layer 203 and the outer circumferential surface of the catalyst support 200. The fixing layers 205 are fixed to the surface of the surface electrode layer 204 with the wiring portions 202 in between. The metal electrode layer 203 is made of a metal thin plate. The surface electrode layer 204 and the fixing layers 205 are films of porous metal, which are formed through thermal spraying of metallic powder. The metal electrode layer 203 includes a base 206 to which an end of each wiring portion 202 is connected. The metal electrode layer 203 also includes a terminal portion 207, to which an external wire is connected when the electrically heated catalyst device is assembled with an internal combustion engine. The terminal portion 207 extends from the base 206 in a direction opposite from the wiring portions 202.

In this electrically heated catalyst device, the wiring portions 202 of the metal electrode layer 203 need to be fixed while being brought into close contact with the surface of the surface electrode layer 204. If the wiring portions 202 warp, the wiring portions 202 are fixed with parts thereof separated from the surface of the surface electrode layer 204. To deal with this, the electrically heated catalyst device of the related art described above uses a metal thin plate 210, which has the shape shown in FIG. 11, as the material of the metal electrode layer 203. This allows the wiring portions 202 to be easily fixed while being brought into close contact with the surface of the surface electrode layer 204.

FIG. 11 is a plan view of the metal thin plate 210, which is the material of the metal electrode layer 203. The metal thin plate 210 includes the wiring portions 202, the base 206, and the terminal portion 207. The metal thin plate 210 further includes a second base 208 and a pseudo terminal portion 209, which have symmetrical shapes of the base 206 and the terminal portion 207, and are located on the opposite side of the wiring portions 202 from the base 206 and the terminal portion 207.

The electrode 201 of the above-described electrically heated catalyst device is formed in the following manner. When forming the electrode 201, the surface electrode layer 204 is first formed on the outer circumferential surface of the catalyst support 200 through thermal spraying. Next, with the metal thin plate 210 arranged such that the wiring portions 202 are located on the surface of the surface electrode layer 204, the terminal portion 207 and the pseudo terminal portion 209 are held to apply tension to the metal thin plate 210, so that the wiring portions 202 are taut. In this state, the wiring portions 202 are pressed against the surface of the surface electrode layer 204. Then, the fixing layers 205 are formed through thermal spraying, so that the wiring portions 202 are fixed to the surface of the surface electrode layer 204. Thereafter, the metal thin plate 210 is cut along the long-dash double-short-dash line shown in FIG. 11 to remove the second base 208 and the pseudo terminal portion 209, which are unnecessary for the metal electrode layer 203, thereby forming the electrode 201.

In the above-described electrically heated catalyst device, the metal thin plate 210, which is the material of the metal electrode layer 203, has the pseudo terminal portion 209, which is located on the side opposite from the terminal portion 207. The terminal portion 207 and the pseudo terminal portion 209 are each used as a pull tab. This allows the wiring portions 202 to be brought into close contact with the surface of the surface electrode layer 204 when the wiring portions 202 are fixed. However, the second base 208 and the pseudo terminal portion 209 are unnecessary for the metal electrode layer 203. Thus, after the wiring portions 202 are fixed, the metal thin plate 210 must be cut to remove these unnecessary portions. If the metal thin plate 210 cut through physical actions provided from the outside using a cutter or laser irradiation, the surface of the surface electrode layer 204 and/or the outer circumferential surface of the catalyst support 200 may be scratched. This causes deterioration of the quality and/or a reduction in the yield of the electrically heated catalyst device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of manufacturing an electrically heated catalyst device is provided. The electrically heated catalyst device includes a cylindrical catalyst support that supports a catalyst and includes an electroconductive material, a film-shaped surface electrode layer, which is provided on an outer circumferential surface of the catalyst support, a metal electrode layer, which is made of a metal thin plate, and a fixing layer. The metal electrode layer includes a base, wiring portions, and a terminal portion. The wiring portions extend from the base in a circumferential direction of the catalyst support. The wiring portions are arranged on a surface of the surface electrode layer and in parallel with each other in an axial direction of the catalyst support. The terminal portion extends from an end of the base that is on a side opposite, in the circumferential direction of the catalyst support, from a side of the base at which the wiring portions are located. The fixing layer is fixed to the surface of the surface electrode layer with the wiring portions in between. The method includes preparing the metal thin plate as the material of the metal electrode layer. The metal thin plate includes the wiring portions, the base, the terminal portion, a second base, which is connected to ends of the wiring portions on a side opposite from the ends connected to the base, and a pseudo terminal portion extending from an end of the second base that is on a side opposite, in an extending direction of the wiring portions, from a side of the second base at which the wiring portions are located. The method manufactures the electrically heated catalyst device through steps (1) to (3) discussed below. Step (1) includes pressing the wiring portions against the surface of the surface electrode layer formed on the outer circumferential surface of the catalyst support, while holding the terminal portion and the pseudo terminal portion, and applying a tension to the metal thin plate. Step (2) includes forming the fixing layer through thermal spraying with the wiring portions pressed against the surface of the surface electrode layer. Step (3) includes supplying current between the terminal portion and the pseudo terminal portion of the metal thin plate after the fixing layer is formed, and forming the metal electrode layer by removing a portion of the metal thin plate between a smallest cross-sectional area portion and a distal end of the pseudo terminal portion through melting and cutting of the smallest cross-sectional area portion using Joule heat generated by the supplied current, the smallest cross-sectional area portion being a part of the metal thin plate that has a smallest area in a cross section perpendicular to the extending direction of the wiring portions.

In the above-described manufacturing method, the material of the metal electrode layer is a metal thin plate that includes the terminal portion and the pseudo terminal portion, which extends in the direction opposite from the terminal portion. With this metal thin plate, the wiring portions can be made taut without warping by holding the terminal portion and the pseudo terminal portion and pulling the wiring portions from the opposite sides. In this state, the wiring portions are pressed against the surface of the surface electrode layer, and the fixing layer is formed through thermal spraying, so that the wiring portions are fixed while being brought into close contact with the surface of the surface electrode layer.

The metal electrode layer of the metal thin plate includes an unnecessary portion, which needs to be removed after the wiring portions are fixed to the surface electrode layer. In the above-described manufacturing method, current is supplied between the terminal portion and the pseudo terminal portion, so that the accompanying Joule heat melts and cuts the metal thin plate to remove the unnecessary portion from the metal electrode layer. The part of the metal thin plate in which the current density is the greatest when current is supplied between the terminal portion and the pseudo terminal portion is the part of the metal thin plate that has the smallest area in a cross section perpendicular to the extending direction of the wiring portions, in other words, the above-described smallest cross-sectional area portion. Therefore, if the metal thin plate is formed such that the smallest cross-sectional area portion is located at the boundary between the unnecessary portion and the portion kept in the metal electrode layer, the unnecessary portion of the metal thin plate can be removed by melting and cutting through energization. Since the removal is performed without a physical action provided from the outside, the surface of the surface electrode layer and the outer circumferential surface of the catalyst support are unlikely to be scratched during the process.

The electrically heated catalyst device that is manufactured by the above-described manufacturing method reduces the chance of contact failure between the wiring portions of the metal thin plate and the surface electrode layer, and reduces chance of scratches on the surface of the surface electrode layer and/or on the outer circumferential surface of the catalyst support. The above-described manufacturing method thus improves the quality of the electrically heated catalyst device.

In the above-manufacturing method, the metal thin plate used as the material of the metal electrode layer may include, at an end of each wiring portion on a side closer to the second base, a narrow part having a smallest area in a cross section perpendicular to the extending direction of the wiring portions. A portion of the metal thin plate in which the narrow parts of the wiring portions are formed may be the smallest cross-sectional area portion of the metal thin plate. In this case, the second base and the pseudo terminal portion are removed as unnecessary portions of the metal thin plate after the wiring portions are fixed.

In the above-manufacturing method, the metal thin plate used as the material of the metal electrode layer may be configured such that a narrow part is formed at an end of the pseudo terminal portion that is closer, in the extending direction of the wiring portions, to the second base. The narrow part may have, in the pseudo terminal portion, a smallest area in a cross section perpendicular to the extending direction of the wiring portions. A portion of the metal thin plate in which the narrow part is formed may be the smallest cross-sectional area portion of the metal thin plate. In this case, the portion of the pseudo terminal portion between the narrow part and the distal end is removed as an unnecessary portion of the metal thin plate after the wiring portions are fixed.

In another general aspect, a metal thin plate for an electrode of an electrically heated catalyst device is provided. The metal thin plate is configured to be used as a material of a metal electrode layer in the electrically heated catalyst device. The electrically heated catalyst device includes a cylindrical catalyst support that supports a catalyst and includes an electroconductive material, a film-shaped surface electrode layer, which is provided on an outer circumferential surface of the catalyst support, the metal electrode layer, which is made of the metal thin plate, and a fixing layer fixed to a surface of the surface electrode layer with a part of the metal electrode layer in between. The metal thin plate includes a base, wiring portions, and a terminal portion, a second base, and a pseudo terminal portion. The wiring portions extend from the base in a circumferential direction of the catalyst support. The wiring portions are arranged on the surface of the surface electrode layer and in parallel with each other in an axial direction of the catalyst support. The terminal portion extend from an end of the base that is on a side opposite, in the circumferential direction of the catalyst support, from a side of the base at which the wiring portions are located. The second base is connected to ends of the wiring portions on a side opposite from the ends connected to the base. The pseudo terminal portion extends from an end of the second base that is on a side opposite, in an extending direction of the wiring portions, from a side of the second base to which the wiring portions are connected. A smallest cross-sectional area portion of the metal thin plate is provided at a position on the metal thin plate that is closer to a distal end of the pseudo terminal portion than ends of the wiring portions that are connected to the base. The smallest cross-sectional area portion is a part of the metal thin plate that has a smallest area in a cross section perpendicular to the extending direction of the wiring portions.

The use of the above-described metal thin plate for an electrode as the material of the metal electrode layer allows the electrically heated catalyst device to be manufactured by the above-described manufacturing method. This improves the quality of the electrically heated catalyst device. The metal thin plate for an electrode may be configured such that the wiring portions each include a narrow part at an end on a side connected to the second base. The narrow part may have a smaller area in a cross section perpendicular to the extending direction of the wiring portion than remaining parts of the wiring portion. A portion of the metal thin plate in which the narrow parts of the wiring portions are provided may be the smallest cross-sectional area portion of the metal thin plate. Also, the metal thin plate for an electrode may be configured such that a narrow part may be provided at an end of the pseudo terminal portion that is closer, in the extending direction of the wiring portions, to the second base. The narrow part may have, in the pseudo terminal portion, a smallest area in a cross section perpendicular to the extending direction of the wiring portions. A portion in which the narrow part is provided may be the smallest cross-sectional area portion of the metal thin plate.

The above-described manufacturing method forms the metal electrode layer by removing the unnecessary portion of the metal thin plate by melting and cutting through energization. Accordingly, the metal electrode layer of the electrically heated catalyst device that is manufactured by the above-described manufacturing method includes a melted and cut portion. The part that is melted and cut through energization is the part of the metal thin plate that has the smallest area in a cross section perpendicular to the extending direction of the wiring portions. Thus, the area of the melted and cut portion is smaller than or equal to the area of the cross section of the part in the metal electrode layer that has the smallest area in the cross section perpendicular to the circumferential direction of the catalyst support.

Accordingly, the electrically heated catalyst device that is manufactured in the above-described manufacturing method includes a cylindrical catalyst support that supports a catalyst and includes an electroconductive material, a film-shaped surface electrode layer, which is formed on an outer circumferential surface of the catalyst support, a metal electrode layer, and a fixing layer. The metal electrode layer is made of a thin plate of a metal material and includes a base, wiring portions, and a terminal portion. The wiring portions extend from the base in a circumferential direction of the catalyst support. The wiring portions are arranged on a surface of the surface electrode layer and in parallel with each other in an axial direction of the catalyst support. The terminal portion extends from an end of the base that is on a side opposite, in the circumferential direction of the catalyst support, from a side of the base at which the wiring portions are located. The fixing layer is fixed to a surface of the surface electrode layer with the wiring portions in between. A melted and cut portion exists at an end of the metal electrode layer that is on a side opposite, in the circumferential direction of the catalyst support, from a side of the base at which the terminal portion is located. An area of the melted and cut portion is smaller than or equal to an area of a cross section of a part in the metal electrode layer that has a smallest area in a cross section perpendicular to the circumferential direction of the catalyst support.

The electrically heated catalyst device may be configured such that the melted and cut portion is formed on a distal end of each wiring portion. Also, the electrically heated catalyst device may be configured such that the metal electrode layer includes a second base. The second base may be connected to the wiring portions at ends of the wiring portions that are on a side opposite, in the circumferential direction of the catalyst support, from a side at which the base is located. The melted and cut portion may be provided at an end of the second base that is on a side opposite, in the circumferential direction of the catalyst support, from a side of the second base at which the wiring portions are located.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

An electrically heated catalyst device 10 according to a first embodiment will now be described with reference to FIGS. 1 to 7.

Figure 1:
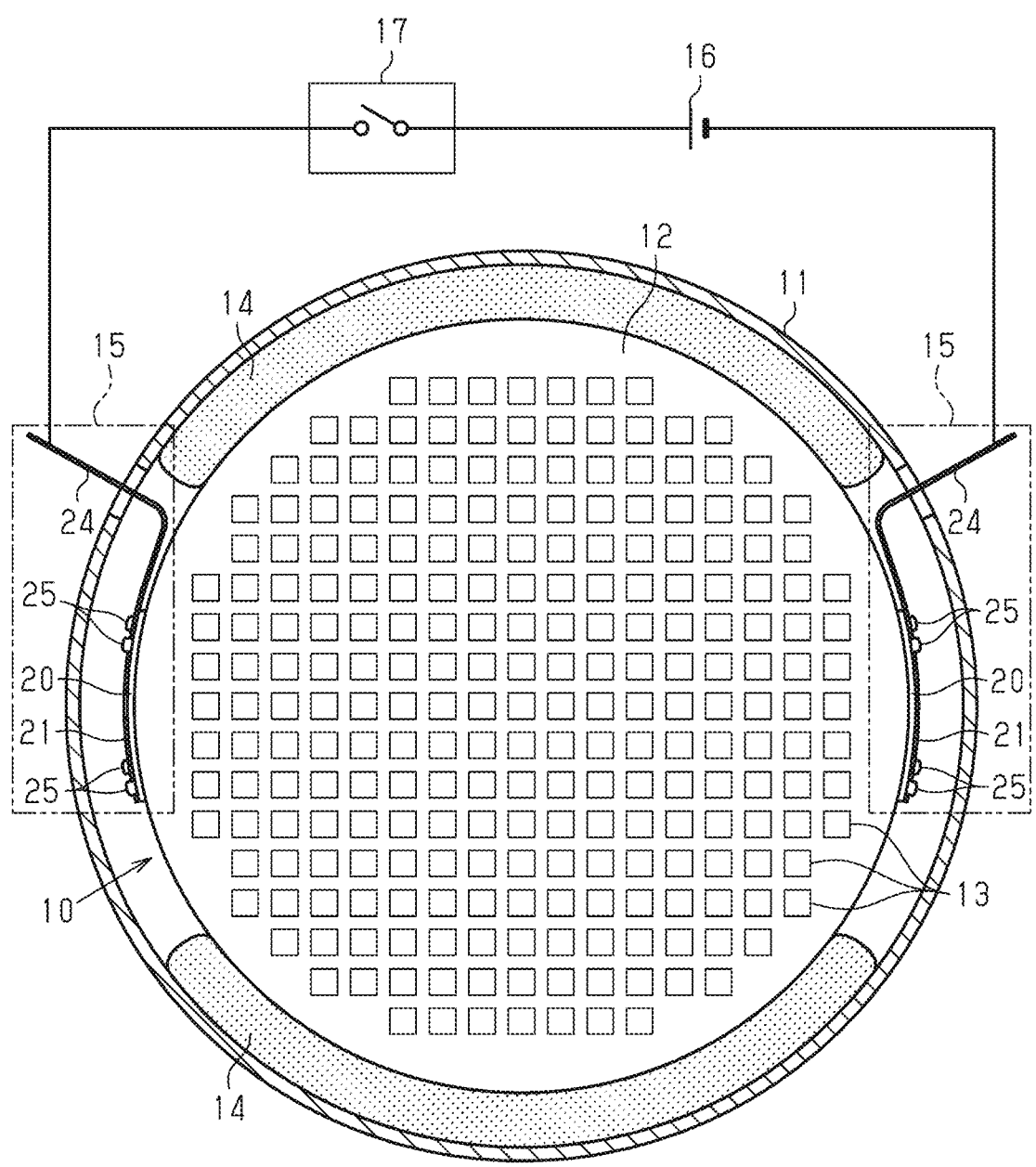
FIG. 1 is a diagram showing a manner in which an electrically heated catalyst device according to a first embodiment is assembled with an internal combustion engine.

As shown in FIG. 1, the electrically heated catalyst device 10 includes a catalyst support 12 installed inside an exhaust pipe 11 of an internal combustion engine mounted on a vehicle. The catalyst support 12 is made of a porous electroconductive material and has a columnar outer shape. In the following description, a direction that is parallel with a column center line of the cylindrical catalyst support 12 will be referred to as an axial direction of the catalyst support 12. Also, in the following description, an orbiting direction about the column center line will be referred to as a circumferential direction of the catalyst support 12, and a direction orthogonal to the column center line will be referred to as a radial direction of the catalyst support 12.

The catalyst support 12 is made of composite ceramics, for example, of silicon carbide particles and silicon particles. The catalyst support 12 incorporates a honeycomb structure with a great number of fine pores 13, which extend in the axial direction. The inner walls of the fine pores 13 support catalyst such as platinum, palladium, and rhodium. Spacers 14 made of an insulating material are placed in the gap between the inner wall of the exhaust pipe 11 and the outer circumference of the catalyst support 12. The spacers 14 insulate the exhaust pipe 11 and the catalyst support 12 from each other.

The electrically heated catalyst device 10 further includes a pair of electrodes 15 on the outer circumference of the catalyst support 12. The electrodes 15 are located at symmetrical positions with respect to the column center line of the catalyst support 12. When the electrically heated catalyst device 10 is assembled with the vehicle, the electrodes 15 are connected to a vehicle on-board power source 16. The vehicle includes a controller 17, which is configured to control turning on and off of energization between the electrodes 15.

In the internal combustion engine equipped with the electrically heated catalyst device 10, the catalyst supported by the catalyst support 12 purifies hazardous constituents in exhaust gas Immediately after the internal combustion engine is started, the temperature of the catalyst support 12 is low, and the catalyst is inactive. During no- or low-load operation of the internal combustion engine, the temperature of exhaust gas flowing in the exhaust pipe 11 is low. If this state continues, the temperature of the catalyst support 12 is lowered, so that the catalyst may become inactive. Accordingly, immediately after the internal combustion engine is started or during no- or low- load operation of the internal combustion engine, the controller 17 supplies current to the catalyst support 12 from the vehicle on-board power source 16, so that Joule heat generated by the current heats the catalyst support 12 to promote activation of the catalyst.

Next, the detailed configuration of the electrode 15 provided in the electrically heated catalyst device 10 of the present embodiment will be described with reference to FIG. 2.

The electrode 15 includes a surface electrode layer 20 provided on the outer circumferential surface of the catalyst support 12. The surface electrode layer 20 is a film of porous metal, which is formed on the outer circumferential surface of the catalyst support 12 through thermal spraying. The surface electrode layer 20 is made of a metal having a high oxidation resistance at high temperatures, such as a nichrome chromium alloy. The surface electrode layer 20 in the electrically heated catalyst device 10 according to the present embodiment has a rectangular shape with long sides extending in the axial direction of the catalyst support 12 and short sides extending in the circumferential direction.

The electrode 15 includes a metal electrode layer 21 provided on the surface of the surface electrode layer 20. The metal electrode layer 21 is a metal thin plate for an electrode that is made of a heat-resistant alloy, which is, for example, a ferritic-iron-chromium-aluminum alloy with added yttrium (FeCrAlY alloy). The metal electrode layer 21 includes a base 22 and wiring portions 23. The wiring portions 23 extend from the base 22 in the circumferential direction of the catalyst support 12 and are arranged in parallel with each other in the axial direction of the catalyst support 12. The surface electrode layer 20 is arranged between the wiring portions 23 of the metal electrode layer 21 and the outer circumferential surface of the catalyst support 12. That is, the wiring portions 23 of the metal electrode layer 21 are arranged in the axial direction of the catalyst support 12 on the surface of the surface electrode layer 20.

In addition, the metal electrode layer 21 includes a terminal portion 24. The terminal portion 24 extends from the end of the base 22 that is on a side opposite, in the circumferential direction of the catalyst support 12, from the side of the base 22 at which the wiring portions 23 is located. The terminal portion 24 of the metal electrode layer 21 is bent outward in the radial direction of the catalyst support 12. When the electrically heated catalyst device 10 is assembled with the vehicle, an external wire is connected to the terminal portion 24.

The electrode 15 further includes fixing layers 25 configured to fix the wiring portions 23 of the metal electrode layer 21 to the surface of the surface electrode layer 20. The fixing layers 25 are films made of a porous metal that are formed on the wiring portions 23 and the surface of the surface electrode layer 20. The fixing layers 25 are made of a metal having a high oxidation resistance at high temperatures, such as a nichrome chromium alloy. The fixing layers 25 of the electrode 15 are scattered on the wiring portions 23 of the metal electrode layer 21 and the surface of the surface electrode layer 20. Each fixing layer 25 is fixed to the surface of the surface electrode layer 20 with part of the metal electrode layer 21, that is, one of the wiring portions 23, in between.

Figure 2:
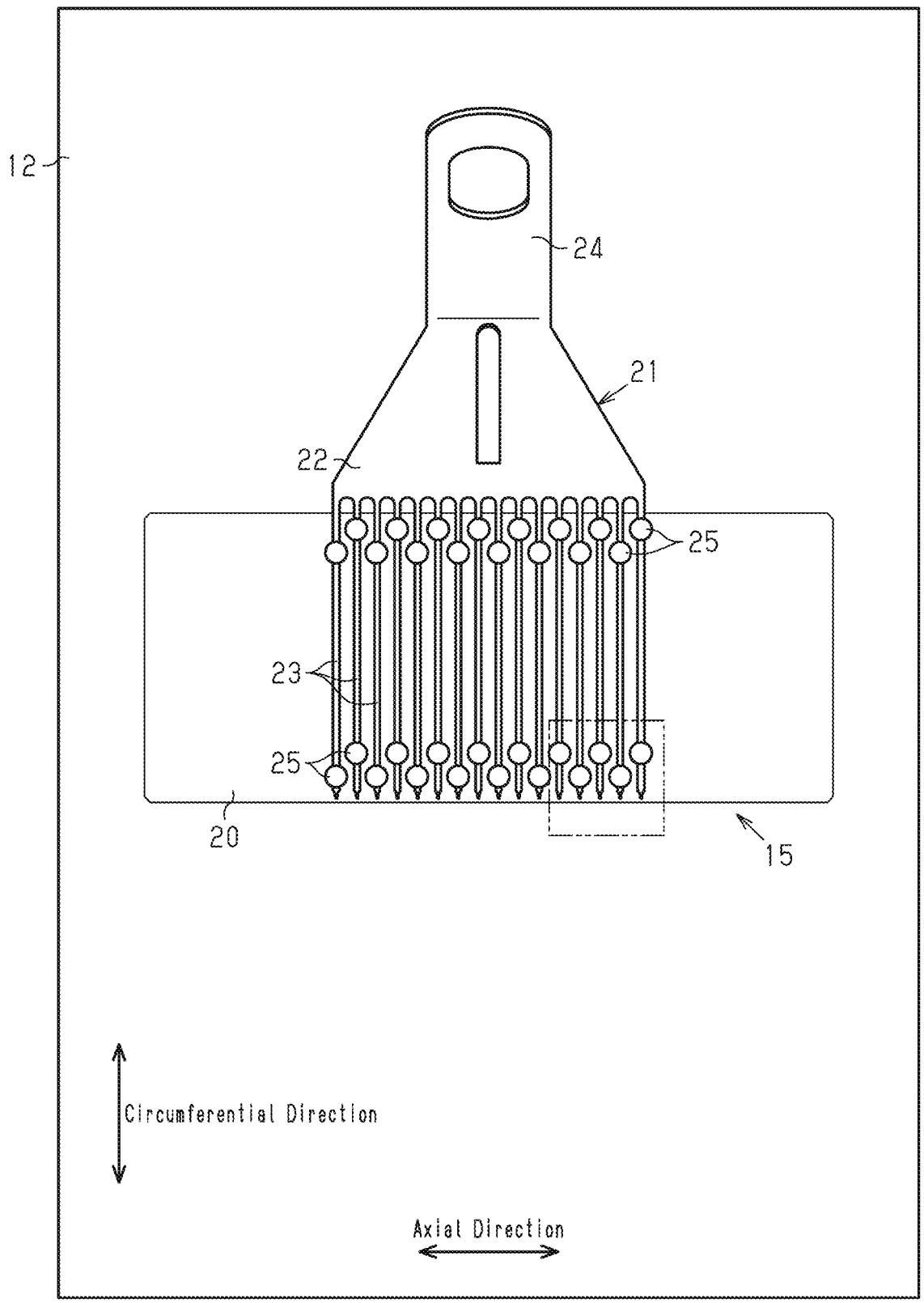
FIG. 2 is a side view of the electrically heated catalyst device.
Figure 3:
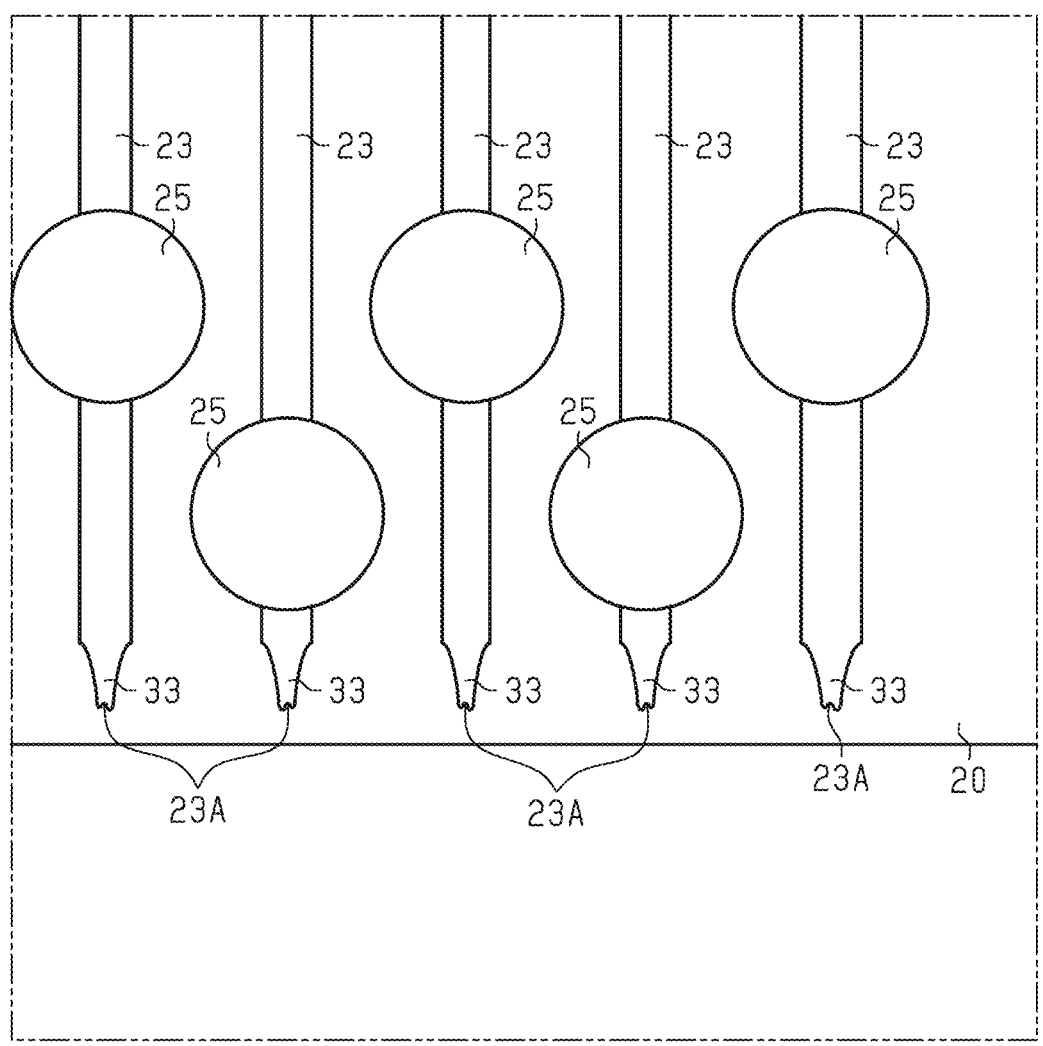
FIG. 3 is an enlarged view of the region surrounded by the long-dash double-short-dash line in FIG. 2.

FIG. 3 shows, in an enlarged manner, the region surrounded by the long-dash double-short-dash line in FIG. 2. Each wiring portion 23 includes a tapered distal end portion. The distal end portion includes a distal end 23A, which is a coarse surface with traces of melting and cutting. The end faces at the outer edges of the metal electrode layer 21 other than the distal ends 23A are cut surfaces that are formed through punching and are smoother than the distal ends 23A.

A manufacturing method related to formation of the electrode 15 in the electrically heated catalyst device 10 will now be described. In the present embodiment, a metal thin plate that will be discussed below is used as the material of the metal electrode layer 21 of the electrode 15. That is, the manufacturing method includes preparation of a metal thin plate as the material of the metal electrode layer 21.

Figure 4:
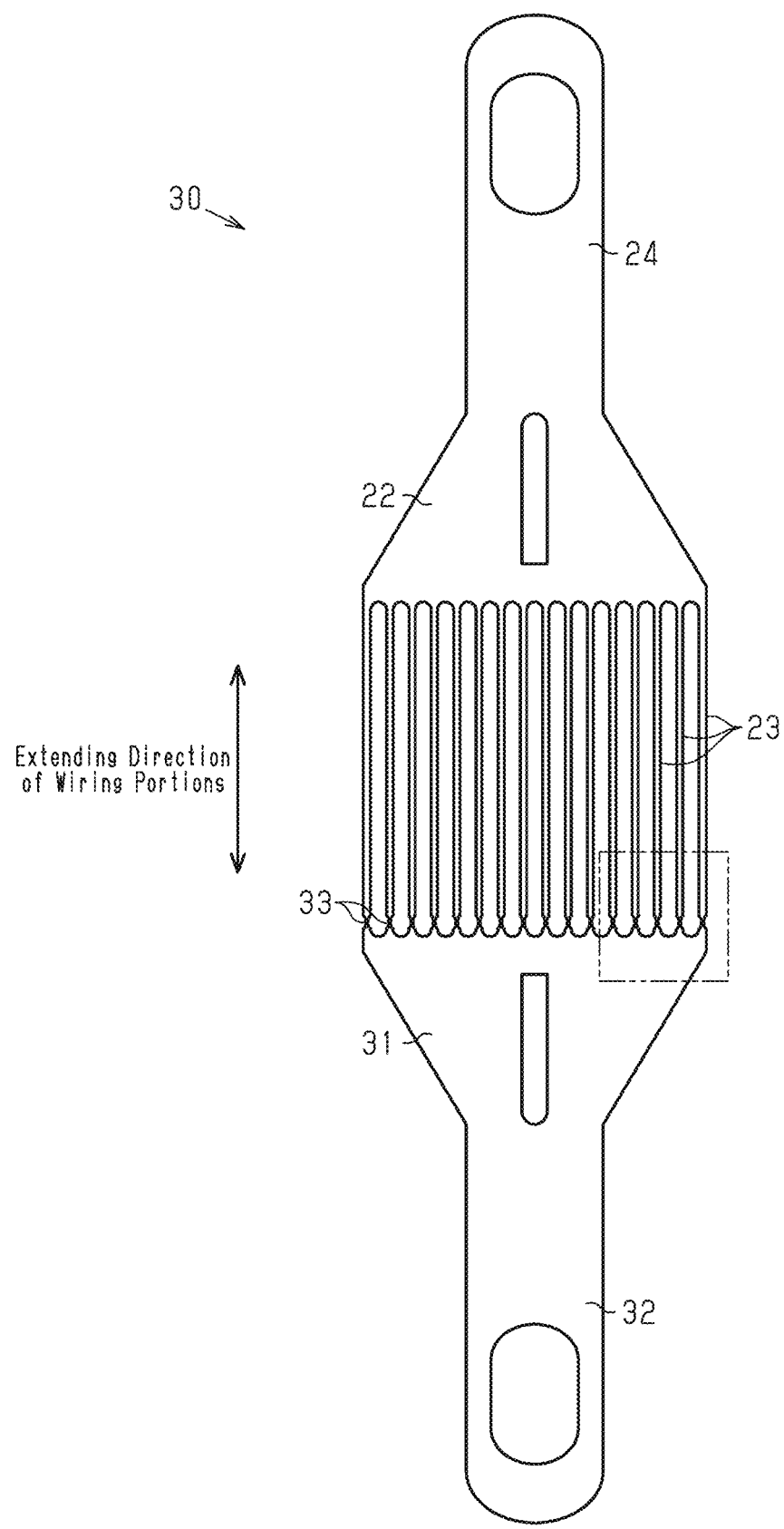
FIG. 4 is a plan view of a metal thin plate that is the material of the metal electrode layer used in the electrode of the electrically heated catalyst device.

FIG. 4 is a plan view of a metal thin plate 30, which is the material of the metal electrode layer 21. The metal thin plate 30 includes the base 22 of the metal electrode layer 21, the wiring portions 23, and the terminal portion 24. The metal thin plate 30 additionally has a portion that will not be kept as part of the metal electrode layer 21. Specifically, the metal thin plate 30 includes structures similar to the base 22 and the terminal portion 24 on the opposite side of the wiring portions 23 from the base 22 and the terminal portion 24. In the following description, the base 22 that will be kept in the metal electrode layer 21 will be referred to as a first base 22, and the base that will not be kept will be referred to as a second base 31. Also, in the following description, the part that corresponds to the terminal portion 24 and will not be kept in the metal electrode layer 21 will be referred to as a pseudo terminal portion 32.

Figure 5:
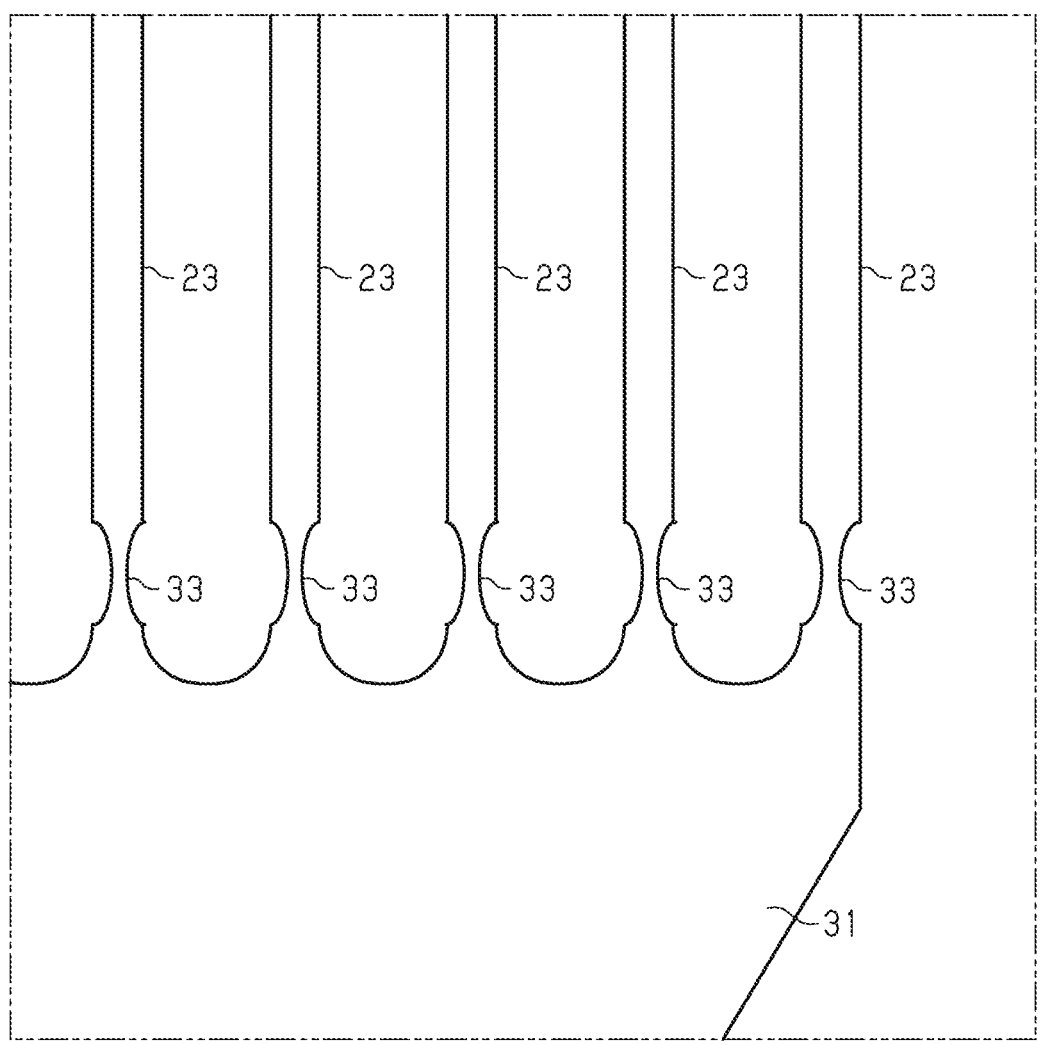
FIG. 5 is an enlarged view of the region surrounded by the long-dash double-short-dash line in FIG. 4.

FIG. 5 shows, in an enlarged manner, the region surrounded by the long-dash double-short-dash line in FIG. 4. As shown in FIG. 5, each wiring portion 23 includes a narrow part 33 at an end closer to the second base 31. The narrow part 33 has a smaller width than the remaining parts of the wiring portion 23. In the following description, the cross section of the metal thin plate 30 perpendicular to the extending direction of the wiring portions 23 will be referred to as a transverse section of the metal thin plate 30. The part in the metal thin plate 30 in which the narrow part 33 of each wiring portion 23 is formed has the smallest area in the transverse section in the metal thin plate 30. In the part in which the wiring portions 23 are provided, the total of the areas in the transverse section of the wiring portions 23 is the area in the transverse section of the metal thin plate 30. In the following description, the part of the metal thin plate 30 in which the area in the transverse section is the smallest will be referred to as a smallest cross-sectional area portion of the metal thin plate 30.

Next, the procedure for forming the electrode 15 in the electrically heated catalyst device 10 of the present embodiment will be described. The procedure employs the above-described metal thin plate 30 as the material of the metal electrode layer 21. To form the electrode 15, the surface electrode layer 20 is first formed on the outer circumferential surface of the catalyst support 12 through thermal spraying. Specifically, a paste material obtained by dispersing silicon carbide (SiC) particles and silicon (Si) particles in a dispersion medium is first applied to the outer circumferential surface of the catalyst support 12. The paste material is baked to form a foundation of the surface electrode layer 20. The application of the paste material can be performed, for example, through screen printing. Subsequently, a metal masking sheet having an opening corresponding to the shape of the surface electrode layer 20 is placed on the foundation. Powder obtained by mixing nichrome chromium alloy particles and bentonite particles is sprayed onto the opening of the masking sheet through thermal spraying such as gas flame spraying or plasma spraying. The thermal sprayed nichrome chromium alloy solidifies on the foundation, which has been formed, so that the surface electrode layer 20 is formed.

Figure 6:
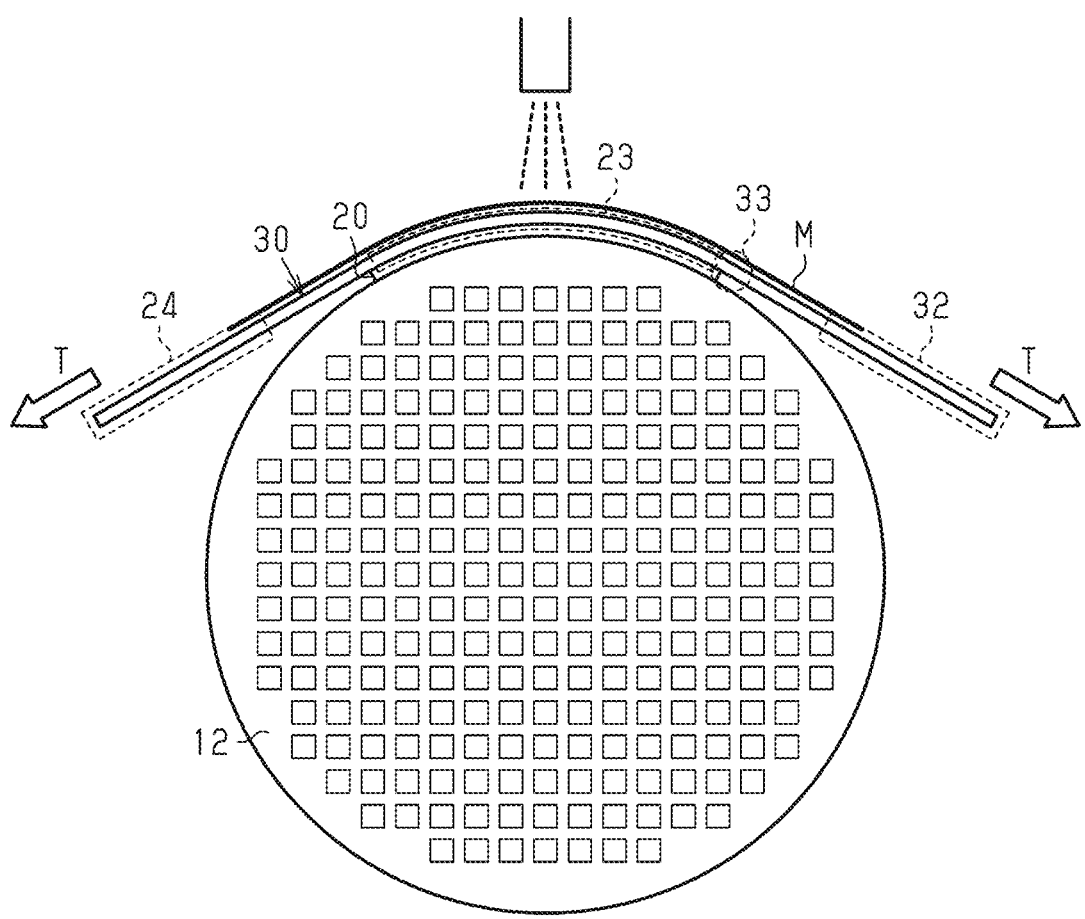
FIG. 6 is a diagram showing a manner in which a step related to fixing of the wiring portions is performed in the manufacture of the electrically heated catalyst device.

Next, as shown in FIG. 6, the metal thin plate 30 is placed such that the wiring portions 23 are located on the surface of the surface electrode layer 20. The terminal portion 24 and the pseudo terminal portion 32 are held, for example, with clamps to apply tension to the metal thin plate 30. This presses the wiring portions 23 against the surface of the surface electrode layer 20 in a taut state without warping. Then, a masking sheet M is placed on the metal thin plate 30. The masking sheet M has openings corresponding to the shapes of the fixing layers 25 at positions where the fixing layers 25 will be formed. In this state, powder obtained by mixing nichrome chromium alloy particles and bentonite particles is sprayed onto the openings of the masking sheet M through thermal spraying. The formed fixing layers 25 fix the wiring portions 23 of the metal thin plate 30 to the surface of the surface electrode layer 20.

Figure 7:
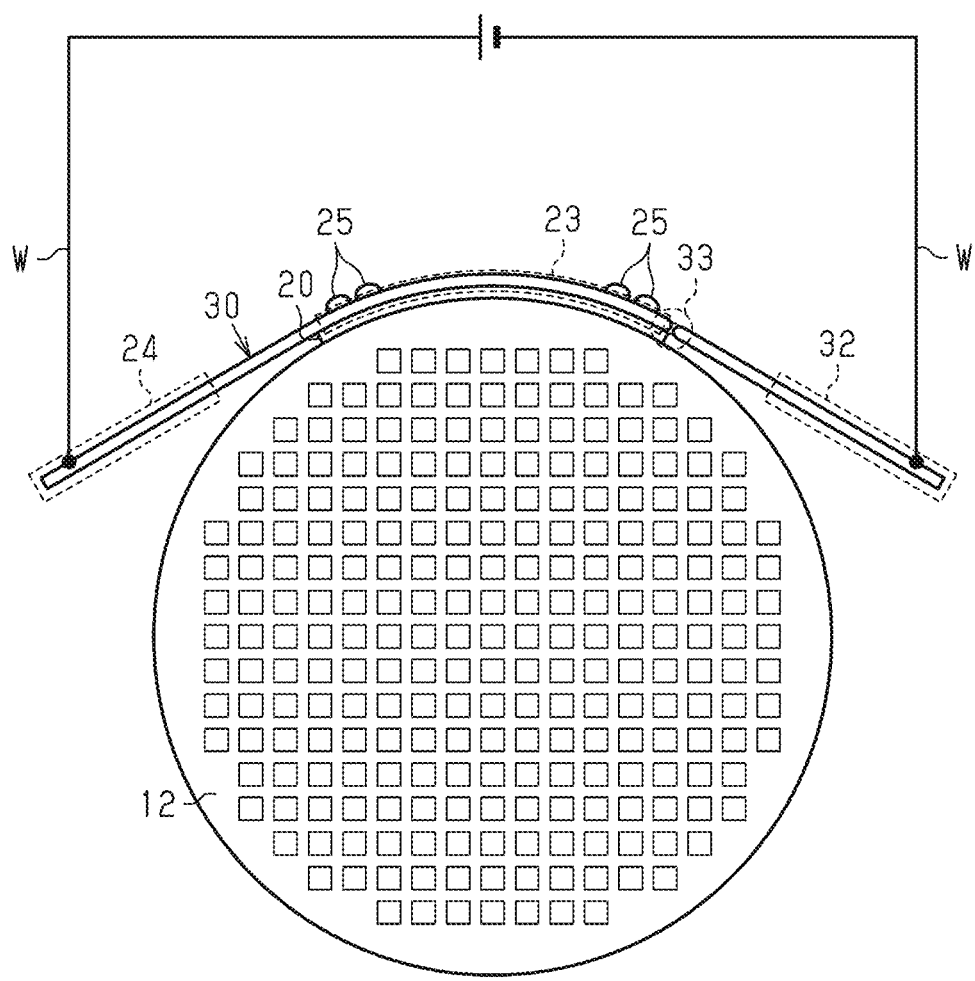
FIG. 7 is a diagram showing a manner in which a step related to removal of the unnecessary portion of the metal thin plate is performed in the manufacture of the electrically heated catalyst device.

Thereafter, as shown in FIG. 7, electric wires W are connected to the terminal portion 24 and the pseudo terminal portion 32 to supply current to the metal thin plate 30. At this time, the part in the metal thin plate 30 in which the current density is the greatest is the part in which the narrow parts 33 of the wiring portions 23 are formed. Thus, when a sufficient current is supplied, the narrow parts 33 of the metal thin plate 30 are the first part in which the temperature reaches the melting point of the metal forming the metal thin plate 30 due to the Joule heat accompanying the energization. In the present embodiment, the narrow parts 33 of the wiring portions 23 are melted and cut in this manner. Specifically, when the narrow parts 33 are heated to the melting point of the material of the metal thin plate 30, the pseudo terminal portion 32 is pulled, so that the second base 31 and the pseudo terminal portion 32 are separated from the remaining parts of the metal thin plate 30. In other words, the unnecessary portion of the metal thin plate 30 is removed, so that the metal electrode layer 21 is formed.

In the electrically heated catalyst device 10, in which the electrodes 15 are formed in the above-described manner, the distal ends 23A of the wiring portions 23 of the metal electrode layer 21 are coarse surfaces with traces of melting and cutting. The total area of the melted and cut portions, that is, the total area of the distal ends 23A of the wiring portions 23, is smaller than the area of the cross section of the part in the metal electrode layer 21 that has the smallest area in the transverse section. The area of the distal end 23A of each wiring portion 23 refers to the projected area of the distal end 23A onto a plane perpendicular to the extending direction of the wiring portion 23.

Strictly speaking, the distal ends of the terminal portion 24 and the pseudo terminal portion 32 have rounded shapes, and the area of the transverse section near the distal end is smaller than the area of the transverse section of the narrow part 33. When supplying current to the metal thin plate 30 in order to melt and cut the narrow parts 33, the electric wires W are connected by holding the terminal portion 24 and the pseudo terminal portion 32 with clamps, so that no current is supplied to the regions including the distal ends of the terminal portion 24 and the pseudo terminal portion 32. Accordingly, when the area of the transverse section of the narrow parts 33 and/or the area of the melted and cut portions are compared with the areas of the transverse section of the remaining portion of the metal thin plate 30 and/or the metal electrode layer 21, the regions including the distal ends of the terminal portion 24 and/or the pseudo terminal portion 32 are excluded from consideration.

As described above, the electrode 15 is provided on the outer circumferential surface of the catalyst support 12 through steps (1) to (3) described below, in the present embodiment. That is, step (1) includes pressing the wiring portions 23 against the surface of the surface electrode layer 20 formed on the outer circumferential surface of the catalyst support 12, while holding the terminal portion 24 and the pseudo terminal portion 32 and applying tension T to the metal thin plate 30. Step (2) includes forming the fixing layers 25 with the wiring portions 23 pressed against the surface of the surface electrode layer 20. Step (3) includes forming the metal electrode layer 21 by: supplying current between the terminal portion 24 and the pseudo terminal portion 32 of the metal thin plate 30 after the fixing layers 25 are formed; and removing a portion of the metal thin plate 30 between the smallest cross-sectional area portion and the distal end of the pseudo terminal portion 32 through melting and cutting of the smallest cross-sectional area portion using the Joule heat generated by the supplied current.

The electrically heated catalyst device 10 and the manufacturing method according to the present embodiment has the following advantages.

(1) The metal thin plate 30 includes the pseudo terminal portion 32. When fixing the wiring portions 23 to the surface of the surface electrode layer 20 by forming the fixing layers 25 through thermal spraying, the pseudo terminal portion 32 is used as a pull tab to apply the tension T for pressing the wiring portions 23 against the surface of the surface electrode layer 20 while making the wiring portions 23 taut without warping. Thus, the wiring portions 23 are easily and properly fixed to the surface of the surface electrode layer 20. This reduces the chance of contact failure between the wiring portions 23 of the metal electrode layer 21 and the surface electrode layers 20.

(2) If the unnecessary portion of the metal thin plate 30 is removed from the metal electrode layer 21 through cutting with a cutter, the surface of the surface electrode layer 20 and/or the outer circumferential surface of the catalyst support 12 may be scratched. The cutting process therefore needs to be performed carefully. In this regard, the present embodiment separates the unnecessary portion of the metal thin plate 30 from the metal electrode layer 21 through melting and cutting by supplying current. This reduces the chance of the surface of the surface electrode layer 20 and/or the outer circumferential surface of the catalyst support 12 being scratched.

(3) Advantages (1) and (2) improve the quality of the electrically heated catalyst device 10.

Second Embodiment

An electrically heated catalyst device according to a second embodiment will now be described with reference to FIGS. 8 and 9. In the present embodiment, like or the same reference numerals are given to those components that are like or the same as the corresponding components of the above-described embodiments, and the detailed description will be omitted.

In the first embodiment, the metal thin plate 30 is melted and cut at the narrow parts 33 of the wiring portions 23 by supplying current after the wiring portions 23 are fixed to the surface of the surface electrode layer 20. This separates the second base 31 and the pseudo terminal portion 32 of the metal thin plate 30 from the metal electrode layer 21. In the present embodiment, only a pseudo terminal portion 132 is separated from a metal electrode layer, and a second base 131 of the metal thin plate 130 remains in the metal electrode layer.

Figure 8:
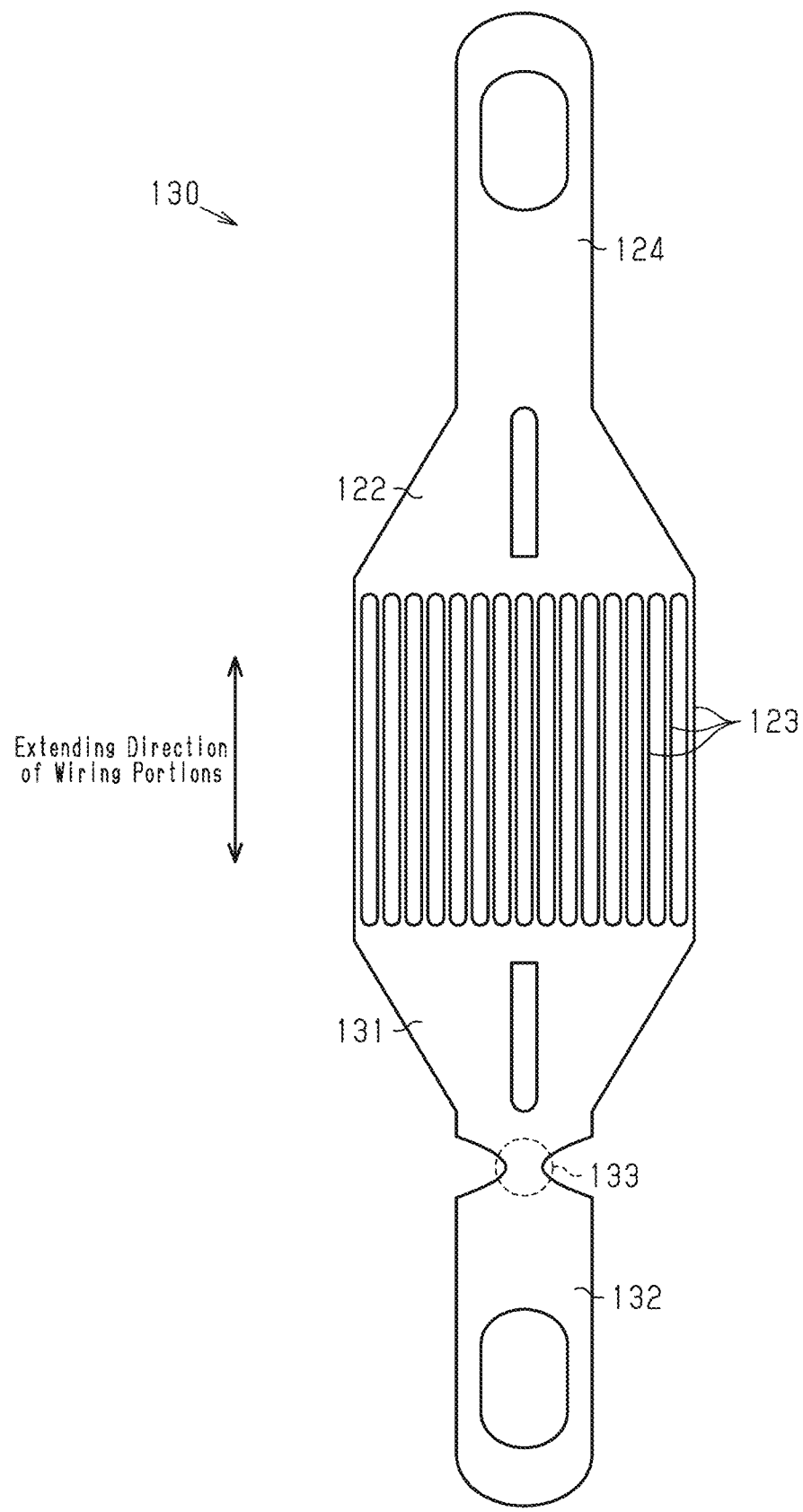
FIG. 8 is a plan view of a metal thin plate that is the material of a metal electrode layer used in an electrode of an electrically heated catalyst device according to a second embodiment.

FIG. 8 is a plan view of the metal thin plate 130 that forms a metal electrode layer of an electrically heated catalyst device according to the present embodiment. Like the metal thin plate 30 of the first embodiment, the metal thin plate 130 of the present embodiment includes wiring portions 123, which are arranged parallel with each other, a first base 122 and the second base 131, which are bridged by the wiring portions 123, a terminal portion 124, and the pseudo terminal portion 132. However, the wiring portions 123 in the metal thin plate 130 of the present embodiment each have a constant width along the entire length, and are not provided with the narrow parts 33 like the wiring portions 23 of the first embodiment. Instead, the metal thin plate 130 of the present embodiment includes a narrow part 133. The narrow part 133 is formed at the end of the pseudo terminal portion 132 that is closer to the second base 131 in the extending direction of the wiring portions 123. The narrow part 133 is the part of the smallest width in the pseudo terminal portion 132. The thickness of the metal thin plate 130, which includes the pseudo terminal portion 132, is constant over its entirety. The narrow part 133 thus has the smallest area in the transverse section in the pseudo terminal portion 132. Also, the narrow part 133 is a smallest cross-sectional area portion, at which the area in the transverse section is the smallest in the metal thin plate 130.

In the present embodiment, the electrode 15 is formed in the same procedure as the first embodiment. However, in the present embodiment, when current is supplied after the wiring portions 123 are fixed, the narrow part 133 in the pseudo terminal portion 132 is melted and cut, so that only the pseudo terminal portion 132 is separated from the remaining portion of the metal thin plate 130.

Figure 9:
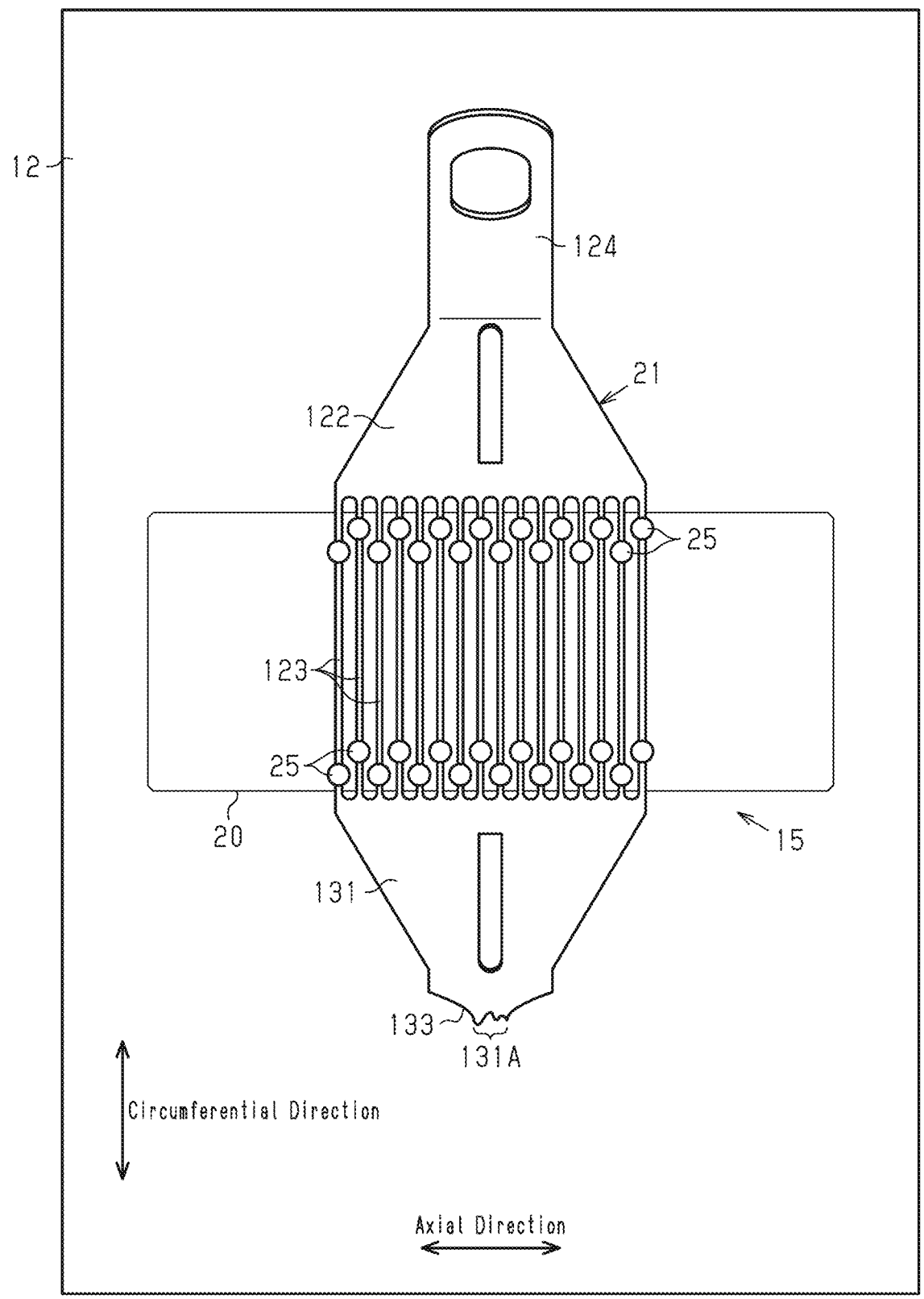
FIG. 9 is a side view of the electrically heated catalyst device of the second embodiment.
Figure 10:
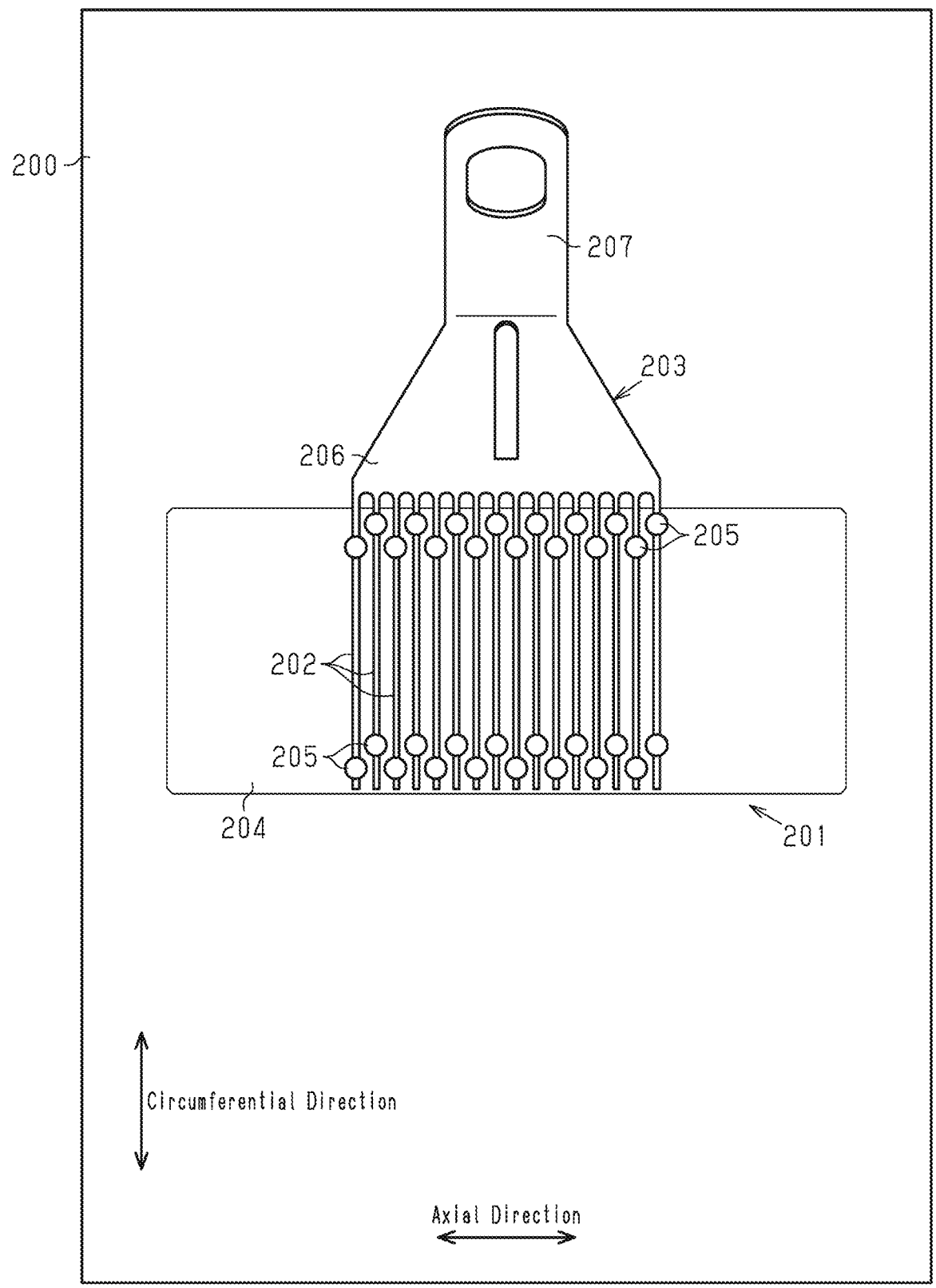
FIG. 10 is a side view of the electrically heated catalyst device of a related art.
Figure 11:
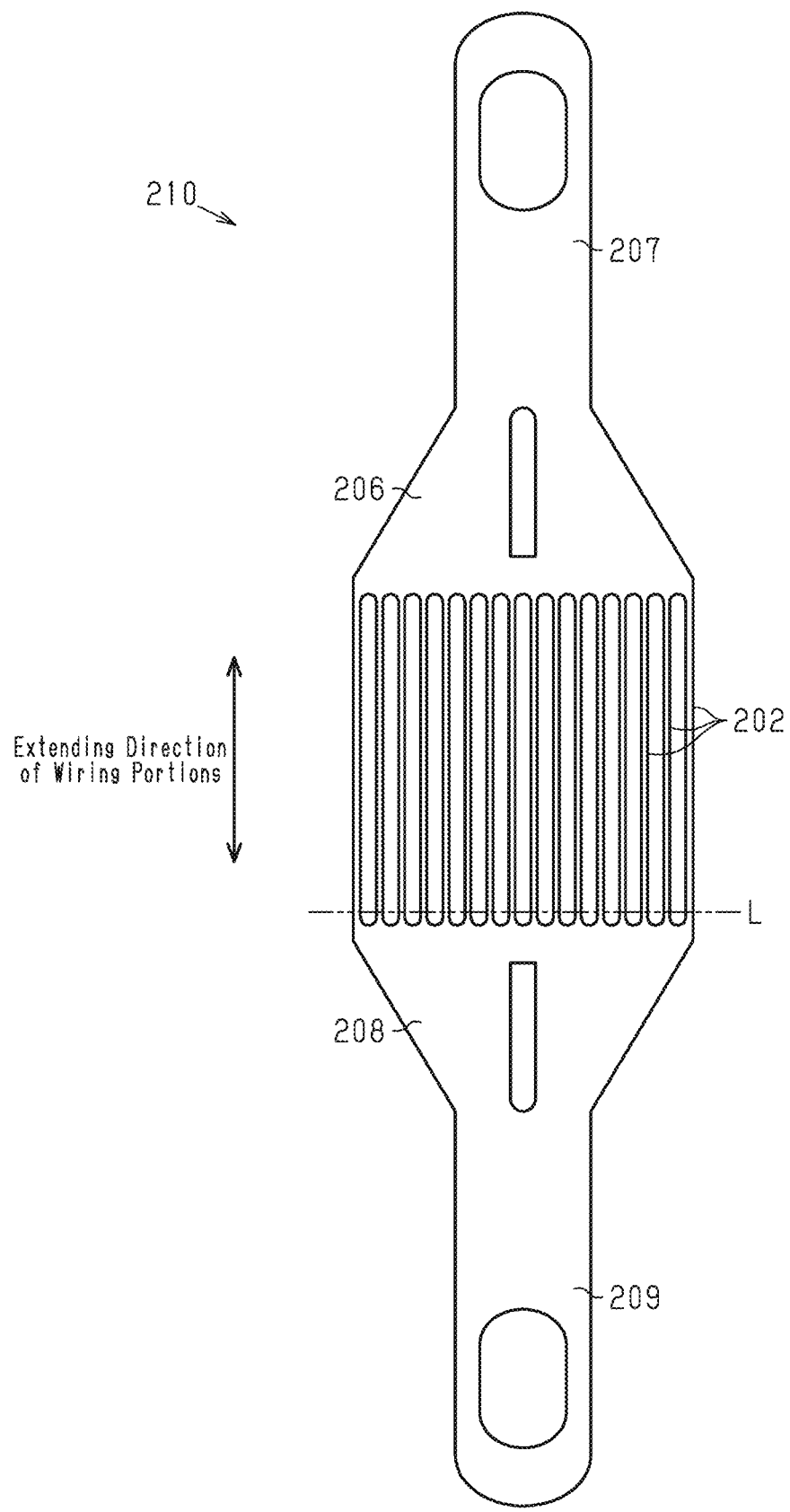
FIG. 11 is a plan view of a metal thin plate that is the material of the metal electrode layer used in the electrode of the electrically heated catalyst device of the related art.

FIG. 9 is a side view of the electrically heated catalyst device of the present embodiment, in which the electrode 15 has been formed in the above-described manner. The metal electrode layer 21 in the electrically heated catalyst device of the present embodiment includes the second base 131. The second base 131 is connected to the wiring portions 123 at the ends of the wiring portions 123 that are on a side opposite, in the circumferential direction of the catalyst support 12, from the side at which the first base 122 is located. A portion in the pseudo terminal portion 132 that is closer to the second base 131 than the narrow part 133 remains in the metal electrode layer 21. The remaining portion of the pseudo terminal portion 132 is also regarded as part of the second base 131. In this state, the metal electrode layer 21 includes a melted and cut portion 131A. The melted and cut portion 131A is located at the end of the second base 131 that is on a side opposite, in the circumferential direction of the catalyst support 12, from the side of the second base 131 at which the wiring portions 123 are located. The area of the melted and cut portion 131A is smaller than the area of the transverse section of the part in the metal electrode layer 21 that has the smallest area in the transverse section. The area of the melted and cut portion 131A refers to the projected area of the melted and cut portion 131A onto a plane perpendicular to the extending direction of the wiring portions 123.

The electrically heated catalyst device of the present embodiment has the following advantage in addition to advantages (1) to (3) above.

(4) The unnecessary portion of the metal thin plate 130 is removed by pulling the pseudo terminal portion 132 when the part to be melted and cut is sufficiently heated. When there are two or more parts to be melted and cut as in the first embodiment, the time at which each part to be melted and cut is heated sufficiently to be separated may vary, making it difficult to choose a time to perform separation. In this regard, since the present embodiment has only one part to be melted and cut, the unnecessary portion of the metal thin plate 130 is easily separated.

The above-described embodiments may be modified as follows. The above-described embodiments and the following modifications can be combined as long as the combined modifications remain technically consistent with each other.

The material of at least one of the catalyst support 12, the surface electrode layer 20, the metal electrode layer 21, and the fixing layers 25 may be changed.

In the metal electrode layer 21, the number of the wiring portions 23, 123 and the shapes of the first bases 22, 122 and the terminal portions 24, 124 may be changed. In the electrode 15, the shape of the surface electrode layer 20 and/or the fixing layers 25 may be changed. Also, the number and/or the positions of the fixing layers 25 may be changed.

In the above-described embodiments, the metal thin plates 30, 130 include the second bases 31, 131 and the pseudo terminal portions 32, 132, which have substantially symmetrical shapes as the first bases 22, 122 and the terminal portions 24, 124. As long as the second bases 31, 131 are coupled to the wiring portions 23, 123, and the pseudo terminal portions 32, 132 can be held, the shapes of these may be changed.

In the first embodiment, the narrow part 33 formed in each wiring portion 23 has a smaller width than the remaining portion of the wiring portion 23. The narrow part 33 may be formed to have a smaller thickness than the remaining portion of the wiring portion 23, or a smaller width and a smaller thickness than the remaining portion of the wiring portion 23. In the second embodiment also, the narrow part 133 may be formed to have a smaller thickness than the remaining portion of the pseudo terminal portion 132, or a smaller thickness and a smaller width than the remaining portion of the pseudo terminal portion 132.

Only one electrode 15 may be provided on the outer circumferential surface of the catalyst support 12, and another electrode 15 may be provided in a part of the catalyst support 12 other than the circumferential surface. Three or more electrodes 15 may be provided on the outer circumferential surface of the catalyst support 12, and the electrically heated catalyst device may be configured such that the pair of the electrodes 15 to be energized is switched.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method of manufacturing an electrically heated catalyst device, wherein
the electrically heated catalyst device includes:
a cylindrical catalyst support that supports a catalyst and includes an electroconductive material;
a film-shaped surface electrode layer, which is provided on an outer circumferential surface of the catalyst support;
a metal electrode layer, which is made of a metal thin plate; and
a fixing layer,
the metal electrode layer includes:
a base;
wiring portions, which extend from the base in a circumferential direction of the catalyst support, the wiring portions being arranged on a surface of the surface electrode layer and in parallel with each other in an axial direction of the catalyst support; and
a terminal portion extending from an end of the base that is on a side opposite, in the circumferential direction of the catalyst support, from a side of the base at which the wiring portions are located, and
the fixing layer is fixed to the surface of the surface electrode layer with the wiring portions in between,
the method comprising:
preparing the metal thin plate as the material of the metal electrode layer, the metal thin plate including:
the wiring portions,
the base,
the terminal portion,
a second base, which is connected to ends of the wiring portions on a side opposite from the ends connected to the base, and
a pseudo terminal portion extending from an end of the second base that is on a side opposite, in an extending direction of the wiring portions, from a side of the second base at which the wiring portions are located;
pressing the wiring portions against the surface of the surface electrode layer formed on the outer circumferential surface of the catalyst support, while holding the terminal portion and the pseudo terminal portion, and applying a tension to the metal thin plate;
forming the fixing layer through thermal spraying with the wiring portions pressed against the surface of the surface electrode layer;
supplying current between the terminal portion and the pseudo terminal portion of the metal thin plate after the fixing layer is formed; and
forming the metal electrode layer by removing a portion of the metal thin plate between a smallest cross-sectional area portion and a distal end of the pseudo terminal portion through melting and cutting of the smallest cross-sectional area portion using Joule heat generated by the supplied current, the smallest cross-sectional area portion being a part of the metal thin plate that has a smallest area in a cross section perpendicular to the extending direction of the wiring portions.

2. The method of manufacturing the electrically heated catalyst device according to claim 1, wherein
the preparing the metal thin plate includes forming, at an end of each wiring portion on a side closer to the second base, a narrow part having a smallest area in a cross section perpendicular to the extending direction of the wiring portions, and
a portion of the metal thin plate in which the narrow parts of the wiring portions are formed is the smallest cross-sectional area portion of the metal thin plate.

3. The method of manufacturing the electrically heated catalyst device according to claim 1, wherein
the preparing the metal thin plate includes forming a narrow part at an end of the pseudo terminal portion that is closer, in the extending direction of the wiring portions, to the second base, the narrow part having, in the pseudo terminal portion, a smallest area in a cross section perpendicular to the extending direction of the wiring portions, and a portion of the metal thin plate in which the narrow part is formed is the smallest cross-sectional area portion of the metal thin plate.

4. A metal thin plate for an electrode of an electrically heated catalyst device, wherein
the metal thin plate is configured to be used as a material of a metal electrode layer in the electrically heated catalyst device,
the electrically heated catalyst device includes:
a cylindrical catalyst support that supports a catalyst and includes an electroconductive material;
a film-shaped surface electrode layer, which is provided on an outer circumferential surface of the catalyst support;
the metal electrode layer, which is made of the metal thin plate; and
a fixing layer fixed to a surface of the surface electrode layer with a part of the metal electrode layer in between,
the metal thin plate comprising:
a base;
wiring portions, which extend from the base in a circumferential direction of the catalyst support, the wiring portions being arranged on the surface of the surface electrode layer and in parallel with each other in an axial direction of the catalyst support;
a terminal portion extending from an end of the base that is on a side opposite, in the circumferential direction of the catalyst support, from a side of the base at which the wiring portions are located;
a second base, which is connected to ends of the wiring portions on a side opposite from the ends connected to the base; and
a pseudo terminal portion, extending from an end of the second base that is on a side opposite, in an extending direction of the wiring portions, from a side of the second base to which the wiring portions are connected,
wherein a smallest cross-sectional area portion of the metal thin plate is provided at a position on the metal thin plate that is closer to a distal end of the pseudo terminal portion than ends of the wiring portions that are connected to the base, the smallest cross-sectional area portion being a part of the metal thin plate that has a smallest area in a cross section perpendicular to the extending direction of the wiring portions.

5. The metal thin plate for an electrode of an electrically heated catalyst device according to claim 4, wherein
the wiring portions each include a narrow part at an end on a side connected to the second base, the narrow part having a smaller area in a cross section perpendicular to the extending direction of the wiring portion than remaining parts of the wiring portion, and
a portion of the metal thin plate in which the narrow parts of the wiring portions are provided is the smallest cross-sectional area portion of the metal thin plate.

6. The metal thin plate for an electrode of an electrically heated catalyst device according to claim 4, wherein
a narrow part is provided at an end of the pseudo terminal portion that is closer, in the extending direction of the wiring portions, to the second base, the narrow part having, in the pseudo terminal portion, a smallest area in a cross section perpendicular to the extending direction of the wiring portions, and
a portion in which the narrow part is provided is the smallest cross-sectional area portion of the metal thin plate.

7. An electrically heated catalyst device, comprising:
a cylindrical catalyst support that supports a catalyst and includes an electroconductive material;
a film-shaped surface electrode layer, which is formed on an outer circumferential surface of the catalyst support;
a metal electrode layer, which is made of a thin plate of a metal material and includes
a base,
wiring portions, which extend from the base in a circumferential direction of the catalyst support, the wiring portions being arranged on a surface of the surface electrode layer and in parallel with each other in an axial direction of the catalyst support, and
a terminal portion, extending from an end of the base that is on a side opposite, in the circumferential direction of the catalyst support, from a side of the base at which the wiring portions are located; and
a fixing layer fixed to a surface of the surface electrode layer with the wiring portions in between, wherein
a melted and cut portion exists at an end of the metal electrode layer that is on a side opposite, in the circumferential direction of the catalyst support, from a side of the base at which the terminal portion is located, and
an area of the melted and cut portion is smaller than or equal to an area of a cross section of a part in the metal electrode layer that has a smallest area in a cross section perpendicular to the circumferential direction of the catalyst support.

8. The electrically heated catalyst device according to claim 7, wherein the melted and cut portion is formed on a distal end of each wiring portion.

9. The electrically heated catalyst device according to claim 7, wherein
the metal electrode layer includes a second base,
the second base is connected to the wiring portions at ends of the wiring portions that are on a side opposite, in the circumferential direction of the catalyst support, from a side at which the base is located, and
the melted and cut portion is provided at an end of the second base that is on a side opposite, in the circumferential direction of the catalyst support, from a side of the second base at which the wiring portions are located.

* * * * *